US008925774B2

(12) United States Patent
Mori et al.

(10) Patent No.: US 8,925,774 B2
(45) Date of Patent: Jan. 6, 2015

(54) HARNESS FOR A HANDHELD POWER EQUIPMENT

(75) Inventors: Ryota Mori, Anjo (JP); Tomohiro Hachisuka, Anjo (JP); Masahiro Ito, Anjo (JP)

(73) Assignee: Makita Corporation, Anjo-Shi (JP)

( * ) Notice: Subject to any disclaimer, the term of this patent is extended or adjusted under 35 U.S.C. 154(b) by 1024 days.

(21) Appl. No.: 12/662,155

(22) Filed: Apr. 1, 2010

(65) Prior Publication Data
US 2010/0270344 A1 Oct. 28, 2010

(30) Foreign Application Priority Data

Apr. 24, 2009 (JP) ................................. 2009-106327
Apr. 24, 2009 (JP) ................................. 2009-106328
Apr. 24, 2009 (JP) ................................. 2009-106329
Dec. 10, 2009 (JP) ................................. 2009-280096

(51) Int. Cl.
*A45F 3/08* (2006.01)
*A45F 3/04* (2006.01)
*A45F 3/14* (2006.01)
*A01D 34/90* (2006.01)
A45F 3/12 (2006.01)

(52) U.S. Cl.
CPC ............. *A45F 3/14* (2013.01); *A45F 2003/125* (2013.01); *A01D 34/902* (2013.01); *A45F 2003/146* (2013.01)
USPC ........................... 224/261; 224/259; 224/576

(58) Field of Classification Search
USPC ......... 224/259, 262, 628, 629, 630, 637, 258, 224/260, 268, 250, 220
See application file for complete search history.

(56) References Cited

U.S. PATENT DOCUMENTS

| 1,631,694 | A | * | 6/1927 | Rick | 224/264 |
| 1,969,199 | A | | 8/1934 | Battles | |
| 2,271,136 | A | * | 1/1942 | Geiger | 224/200 |
| 2,651,441 | A | * | 9/1953 | Rau et al. | 224/259 |
| 3,938,718 | A | * | 2/1976 | Madison | 224/262 |
| 4,088,252 | A | * | 5/1978 | Grunberger | 224/629 |

(Continued)

FOREIGN PATENT DOCUMENTS

| DE | 196 08 794 A1 | 9/1997 | |
| DE | 19608794 A1 * | 9/1997 | ............... A45F 3/08 |

(Continued)

OTHER PUBLICATIONS

European Search Report dated Aug. 3, 2010 in European Patent Application No. 10157349.1.

(Continued)

*Primary Examiner* — Justin Larson
*Assistant Examiner* — Lester L Vanterpool
(74) *Attorney, Agent, or Firm* — Oliff PLC

(57) ABSTRACT

The harness comprises a backplate, a plurality of belts and an attachment. The backplate is arranged on the back of the user. The plurality of belts is configured so that one end of each belt is connected to the backplate and another end of each belt is connected to each other on the front of the user. The attachment is supported by at least one of the backplate and the plurality of belts, and is configured to be attached to the power equipment. The backplate preferably comprises at least one ventilation groove formed on its inner surface and extending to the edge of the backplate, which allows air to pass between the user and backplate easily.

18 Claims, 17 Drawing Sheets

(56) References Cited

U.S. PATENT DOCUMENTS

| | | | | |
|---|---|---|---|---|
| 4,420,103 A * | 12/1983 | Douglass | | 224/630 |
| 4,483,070 A * | 11/1984 | Junkermann | | 30/296.1 |
| 4,750,654 A * | 6/1988 | Menetrier | | 224/630 |
| 4,776,504 A * | 10/1988 | Panth | | 224/640 |
| 4,934,573 A * | 6/1990 | Jaeger | | 224/628 |
| 5,131,576 A * | 7/1992 | Turnipseed | | 224/262 |
| 5,320,262 A * | 6/1994 | Levis | | 224/630 |
| 5,366,126 A * | 11/1994 | Dausien | | 224/630 |
| 5,553,759 A * | 9/1996 | McMaster et al. | | 224/631 |
| 5,620,121 A | 4/1997 | Watson | | |
| 5,762,243 A * | 6/1998 | McMaster et al. | | 224/262 |
| 5,836,489 A * | 11/1998 | Swetish | | 224/262 |
| 5,911,348 A * | 6/1999 | Shook | | 224/629 |
| 5,913,464 A * | 6/1999 | Haberlein | | 224/259 |
| 5,954,249 A * | 9/1999 | Panth | | 224/234 |
| 6,053,259 A * | 4/2000 | Kojima et al. | | 173/30 |
| 6,247,624 B1 * | 6/2001 | Rundberg | | 224/259 |
| 6,857,820 B2 * | 2/2005 | Jacoway et al. | | 405/186 |
| 7,040,518 B2 * | 5/2006 | von Krane et al. | | 224/646 |
| 7,163,132 B2 * | 1/2007 | Rundberg | | 224/637 |
| 7,367,749 B2 * | 5/2008 | Kim | | 405/186 |
| 7,644,847 B2 * | 1/2010 | Howell | | 224/635 |
| 7,717,310 B2 * | 5/2010 | Zalinsky et al. | | 224/644 |
| 7,793,809 B2 * | 9/2010 | Howell | | 224/628 |
| 2001/0052533 A1 * | 12/2001 | Kubasik | | 224/643 |
| 2005/0000994 A1 * | 1/2005 | Rundberg | | 224/637 |
| 2005/0035170 A1 * | 2/2005 | Sears et al. | | 224/630 |
| 2005/0067448 A1 | 3/2005 | Rundberg | | |
| 2006/0108387 A1 * | 5/2006 | Nakaya et al. | | 224/254 |
| 2006/0144885 A1 * | 7/2006 | Smeuninx | | 224/629 |
| 2007/0090137 A1 * | 4/2007 | Kim | | 224/153 |
| 2007/0205237 A1 * | 9/2007 | Machens et al. | | 224/264 |
| 2008/0121674 A1 * | 5/2008 | Yang | | 224/644 |
| 2008/0257928 A1 * | 10/2008 | Lowry et al. | | 224/638 |

FOREIGN PATENT DOCUMENTS

| | | |
|---|---|---|
| EP | 1 661 446 A1 | 5/2006 |
| EP | 1 832 155 A1 | 9/2007 |
| JP | U-46-2341 | 1/1971 |
| JP | U-57-146828 | 9/1982 |
| JP | U-57-161321 | 10/1982 |
| JP | U-58-141933 | 9/1983 |
| JP | U-63-145419 | 9/1988 |
| JP | A-5-500320 | 1/1993 |
| JP | A-2003-189976 | 7/2003 |
| JP | A-2005-058064 | 3/2005 |
| JP | 2005143453 A * 6/2005 ............ A01D 34/68 |
| JP | A-2005-143453 | 6/2005 |
| WO | WO 91/05495 | 5/1991 |
| WO | WO 02/096239 A1 | 12/2002 |
| WO | WO 2008/076009 A1 | 6/2008 |
| WO | WO 2008/147256 A1 | 12/2008 |

OTHER PUBLICATIONS

Office Action issued in Chinese Patent Application No. 201010154029.7 dated Sep. 22, 2011 (with translation).
Mar. 1, 2012 Extended European Search Report issued in European Patent Application No. 11184853.7.
Jan. 15, 2013 Office Action issued in JP Application No. 2009-106327 (with English translation).
Nov. 6, 2012 Office Action issued in JP Application No. 2009-106327 (with English translation).
Nov. 6, 2012 Office Action issued in JP Application No. 2009-106328 (with English translation).
Nov. 6, 2012 Office Action issued in JP Application No. 2009-106329 (with English translation).
Jun. 25, 2013 Decision of Rejection issued in Japanese Patent Application No. 2009-106329 (with partial English translation).
Jan. 23, 2014 Office Action issued in Russia Patent Application No. 2010116259 (with English translation).
Feb. 18, 2013 Search Report issued in EP Application No. 12195508.2.
Dec. 3, 2013 Office Action issued in Russian Patent Application No. 2010116259/21 (with translation).
Sep. 2, 2014 Office Action issued in Japanese Patent Application No. 2009-106327 (with English Translation).

* cited by examiner

HARNESS FOR A HANDHELD POWER EQUIPMENT

CROSS-REFERENCE TO RELATED APPLICATIONS

This application claims priority to (1) Japanese Patent Application No. 2009-106327 filed on Apr. 24, 2009, (2) Japanese Patent Application No. 2009-106328 filed on Apr. 24, 2009, (3) Japanese Patent Application No. 2009-106329 filed on Apr. 24, 2009, and (4) Japanese Patent Application No. 2009-280096 filed on Dec. 10, 2009, the contents of which are hereby incorporated by reference into the present application.

TECHNICAL FIELD

The present invention relates to a harness that is worn by a user in order to support a handheld power equipment.

DESCRIPTION OF RELATED ART

A harness that is worn by a user in order to support a handheld power equipment, such as a brush cutter or a blower, is disclosed in Japanese Patent Application Publication No. 2005-143453 A. This harness comprises a backplate configured to be arranged on a back of the user, a plurality of belts that are connected to the backplate, an attachment configured to be attached to the handheld power equipment, and a protector plate configured to be arranged between the user wearing the harness and the handheld power equipment attached to the attachment. The user can easily hold the equipment by putting on the harness and attaching the equipment to the attachment. At this point, the protector plate is arranged between the user and the equipment, and prevents the equipment from directly contacting the user.

SUMMARY

With the conventional harness, the inner surface of the backplate is in close contact with the user's back, and thus heat and moisture is trapped between the backplate and the user's back, which consequently may disturb the user with a sense of discomfort.

With the conventional harness, there are problems in that the backplate has a flat shape, the backplate does not fit the user's back, and the harness cannot stably support the handheld power equipment.

The conventional harness is constructed so that the belts connected to the backplate are arranged on the shoulders of the user, and support almost the entire weight of the handheld power equipment with the shoulders of the user. Thus, there is a problem in that the burden on the shoulders of the user is extremely large.

With the conventional harness, the protector plate arranged between the user and the equipment may absorb the vibration and shock transmitted from the equipment to the user to a certain degree. However, the vibration and shock transmitted from the equipment to the user cannot be sufficiently inhibited by simply arranging the protector plate between the user and the equipment. Accordingly, the conventional harness is provided with a pad arranged on the rear surface of the protector plate that comes into contact with the user, which reduces the vibration and shock transmitted from the equipment to the user. According to this construction, although certain effects will be obtained, the construction of the protector plate is complicated.

It is an object of the present teachings to disclose a technique for improving at least one of the problems with the conventional harness, and provide a novel and useful harness. For example, teachings for reducing the discomfort felt by the user due to contact with the backplate may be provided. Alternatively, teachings for conforming the shape of the backplate to the shape of the user's back and thus improve the fit of the backplate may be provided. Alternatively, teachings for reducing the load on the shoulders of the user caused by the weight of the handheld power equipment may be provided. Alternatively, teachings for inhibiting vibration and shock transmitted from the equipment to the user without adding a shock absorbing part, such as a pad, to the protector plate, may be provided.

In one aspect of the present teachings, the harness comprises a backplate, a plurality of belts and an attachment. The backplate is configured to be arranged on the back of the user. Each of the belts has one end being connected to the backplate and another end being connected to each other in the front of the user. The attachment is supported by at least one of the backplate and the plurality of belts, and is configured to be attached to the power equipment.

In one embodiment of the present teachings, it is preferable that the backplate comprises at least one ventilation groove formed on an inner surface of the backplate. Here, the inner surface of the backplate means a surface of the backplate that will be in close contact with the back of the user when the backplate is arranged on the back of the user. According to this construction, ventilation between the backplate and the back of the user will be improved by the ventilation grooves formed in the inner surface of the backplate. In this configuration, it will be difficult for heat and moisture to be trapped between the backplate and the back of the user, and the sense of discomfort felt by the user due to the backplate may be reduced.

In one embodiment of the present teachings, it is preferable that the backplate includes, in a height direction with respect to the user, a posteriorly-convex portion that is convex rearward with respect to the user along the height direction. And, it is also preferable that, in a width direction with respect to the user, side parts of the posteriorly-convex portion of the backplate are more convex rearward than a middle part of the posteriorly-convex portion of the backplate that is located in between the side parts.

The back of the user is curved rearward in a convex shape in the height direction along the curvature of the thoracic vertebrae. Because of this, the fit of the backplate can be improved by making at least a portion of the backplate in the height direction the posteriorly-convex portion that curves rearward with respect to the user in the convex shape in the height direction. Furthermore, both side parts in the width direction of the user's back where the shoulder blade are present are more convex in the rearward direction than the middle part thereof in the width direction. Because of this, with the posteriorly-convex portion of the backplate described above, the fit of the backplate can be further improved by making both side parts in the width direction more convex than the middle part in the width direction.

In one embodiment of the present teachings, it is preferable that the harness further comprises a shoulder plate integrally-formed with the backplate and configured to be arranged on a shoulder of the user. According to this construction, the load on the shoulders of the user (the weight of the handheld power equipment) will be distributed onto the back of the user by the backplate, and thus the burden on the shoulders of the user will be reduced.

The harness may comprise a protector plate configured to be arranged between the user wearing the harness and the handheld power equipment attached to the attachment. In this case, the protector plate may preferably comprise at least one protrusion formed on the edge of the protector plate. The at least one protrusion may protrude toward the handheld power equipment attached to the attachment, and thereby the handheld power equipment is able to contact with the protector plate at the at least one protrusion.

According to the construction of the protector plate described above, the equipment will come into contact with the protrusion formed on the edge of the protector plate, but will not come into contact with the middle part of the protector plate. In contrast, the user will come into contact with the middle part of the protector plate from the opposite side of the equipment. In other words, with this protector plate, the area in which the equipment will come into contact therewith is different from the area in which the user will come into contact therewith. In this configuration, the vibration and shock transmitted from the equipment to the user via the protector plate will be markedly mitigated. Furthermore, the protector plate can passively bend in response to the vibration and shock from the equipment, and can absorb that vibration and shock. In other words, the protector plate functions as a plate spring. According to this protector plate, vibration and shock transmitted from the equipment to the user can be inhibited without adding a shock absorbing component such as a pad.

DETAILED DESCRIPTION OF THE INVENTION

Figure 1:
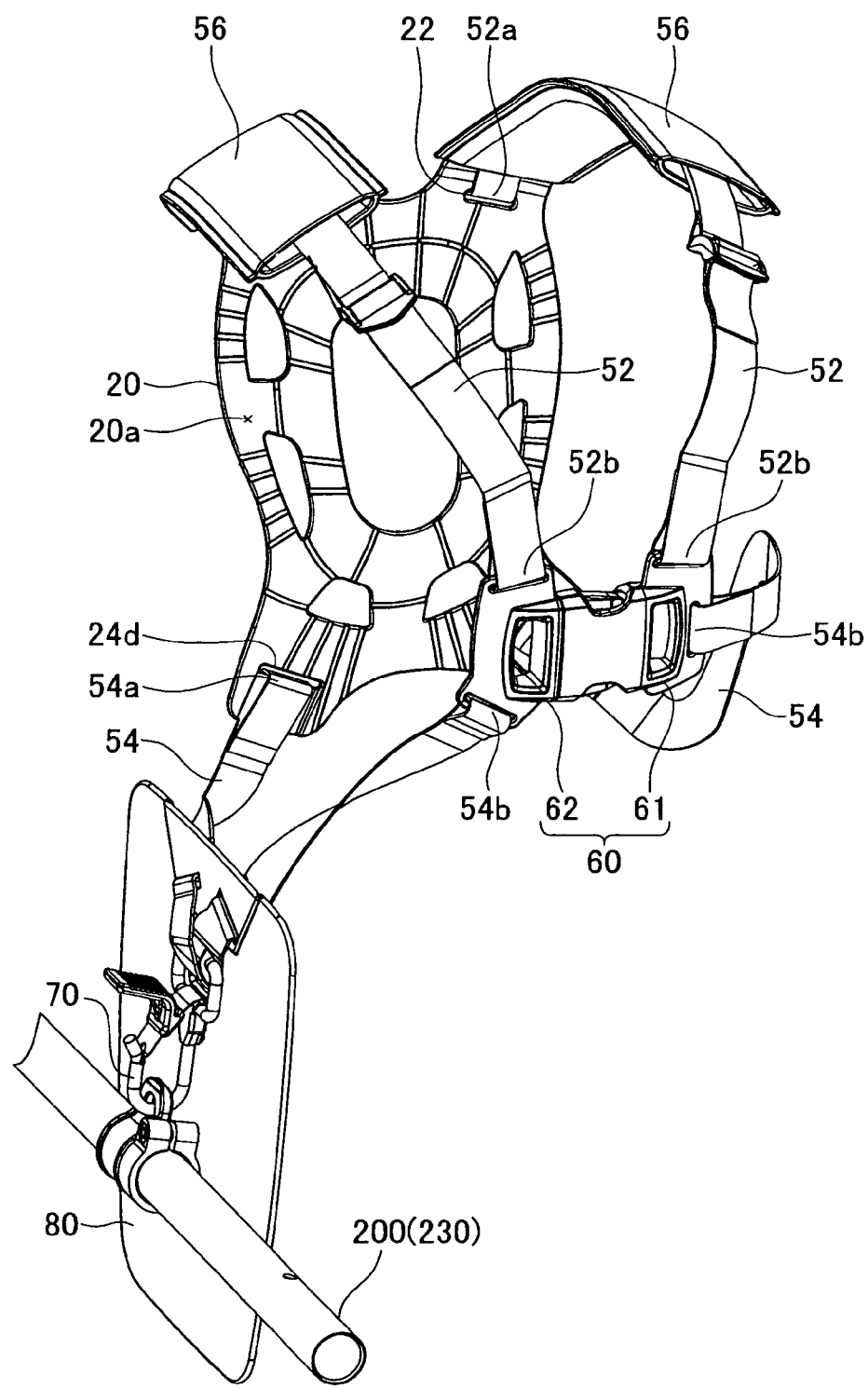
FIG. 1 is a perspective view showing a harness of Embodiment 1.

It is preferable that the backplate comprises at least one ventilation groove formed on its inner surface and extending to the edge of the backplate. According to this construction, when the backplate is arranged on the back of the user, one end of the ventilation groove formed on the inner surface thereof will communicate with the exterior air, and can further increase the ventilation by the ventilation groove.

The backplate may comprises an opening. In this case, it is preferable that the backplate comprises at least one ventilation groove formed on its inner surface and extending from an inner edge of the backplate surrounding the opening to an outer edge of the backplate. According to this construction, heat and moisture generated by the user can be vented with good efficiency by both the opening formed in the backplate and the ventilation groove connected thereto. In this configuration, a feeling of discomfort by the user due to the backplate can be effectively reduced.

It is preferable that the backplate comprises a plurality of openings. In this case, it is preferable that the backplate comprises at least one ventilation groove formed on its inner surface and extending from an inner edge of the backplate surrounding one opening to an inner edge of the backplate surrounding another opening. According to this construction, heat and moisture generated by the user can be vented with good efficiency by both the plurality of openings formed in the backplate and the ventilation groove connected thereto. In this configuration, the feeling of discomfort by the user due to the backplate can be effectively reduced.

It is preferable that the backplate comprises at least two ventilation grooves formed on its inner surface that intersect with each other. Some of the ventilation grooves formed on the inner surface of the backplate will often be blocked by the user's clothing or the like. In this case, the ability of the blocked ventilation grooves to ventilate will be severely reduced. However, if a ventilation groove other than a blocked ventilation groove intersect with each other, and both are in communication with each other, the ability of the blocked ventilation groove to ventilate will be complemented by the other ventilation groove in communication therewith.

It is preferable that the backplate comprises a first opening and a plurality of second openings arranged around the first opening. In this case, a plurality of first ventilation grooves and a plurality of second ventilation grooves are preferably formed on the inner surface of the backplate. Each of the first ventilation grooves may linearly extend from one to another of an inner edge of the backplate surrounding the first opening, an inner edge of the backplate surrounding the second opening, and an outer edge of the backplate. On the other hand, each of the second ventilation grooves may circumferentially extend from one to another of the inner edges of the backplate surrounding the second openings. And, at least one first ventilation groove and at least one second ventilation groove may preferably intersect with each other.

It is preferable that ventilation grooves of the backplate are substantially semicircular in cross section in the width direction. When the ventilation grooves are formed in the backplate, the thickness of the backplate at the positions at which the ventilation grooves are formed will be reduced, and thus stress will concentrate and significant warping will easily occur. In such a case, if the ventilation grooves are substantially semicircular in cross section, the localized concentration of stress produced on the backplate can be mitigated, and the durability of the backplate can be increased.

It is preferable that the backplate is made of a light transmissive material. The harness will often be used outdoors, the backplate will be heated to high temperatures due to sunlight, and the user may feel uncomfortable thereby. In this type of situation, when the backplate has light transmissive properties, the rise in temperature of the backplate can be inhibited, and the feeling of discomfort felt by the user can be reduced.

It is preferable that a middle part of the posteriorly-convex portion of the backplate is further convex forward with respect to the user along the width direction, and the side parts (26b) in the width direction of the posteriorly-convex portion (26) of the backplate (20) is further convex rearward along the width direction. According to this construction, the shape of the backplate can be better fitted to the curve in the width direction of the user's back, and thus the fit of the backplate can be further improved.

It is preferable that an upper edge of the middle part in the width direction of the backplate is arched downward. Although there are individual differences, there is a localized bulge caused by the seventh cervical vertebrae in the upper portion of the user's back. Thus, when the backplate comes into contact with the bulge caused by the seventh cervical vertebrae, a gap will be produced between the backplate and the user's back, and the fit of the backplate will decline significantly. To deal with this, by arching the upper edge of the middle part of the backplate in the width direction downward so as to avoid the bulge caused by the seventh cervical vertebrae, the fit of the backplate can be effectively improved.

It is preferable that the backplate comprises an opening extending in the height direction and at least partially formed within the middle part in the width direction of the posteriorly-convex portion of the backplate. Although there are individual differences, there is one or a plurality of localized bulges caused by the thoracic vertebrae in the middle part of the user's back in the width direction. Thus, when the backplate comes into contact with the bulge caused by the thoracic vertebrae, a gap will be produced between the backplate and the user's back, and the fit of the backplate will decline significantly. To deal with this, by forming the first opening in the middle part of the backplate in the width direction so as to avoid the bulge caused by the thoracic vertebrae, the fit of the backplate can be effectively improved.

It is preferable that the shoulder plate has a length that extends over the shoulder of the user. According to this construction, much of the load on the shoulders of the user can be distributed to the back of the user.

It is preferable that the shoulder plate comprises at least one groove formed on its inner or outer surface and extending across a longitudinal direction of the shoulder plate. According to this construction, the shoulder plate can be freely curved so as to fit the shoulders of the user. The fit of the shoulder plate can be increased, and the load on the shoulders of the user can be further reduced.

It is preferable that the thickness of the shoulder plate is smaller than the thickness of the backplate. It is preferable that the thickness of the shoulder plates be comparatively small, and the flexibility thereof be increased, and thereby improves the fit of the shoulder plates. In contrast, it is preferable that the thickness of the backplate be comparatively large, and the rigidity of the backplate be increased, and thereby distributes the load transmitted thereby from the shoulder plates to the entire backplate.

It is preferable that the shoulder plate is arched convexly outward in the width direction of the user along the longitudinal direction of the shoulder plate. According to this construction, when the shoulder plates are arranged on the shoulders of the user, a sufficient amount of space will be provided between the shoulder plates and the neck of the user, and thus interference between the shoulder plates and the neck of the user can be avoided.

The harness may comprises at least one shoulder belt configured to be arranged on the shoulder of the user, and it is preferable that the shoulder plate comprises a plurality of belt holes through which the shoulder belt is laced. According to this construction, the shoulder belt connected to the backplate will be prevented from coming off of the shoulder plate, even if the user moves into a variety of different positions.

It is preferable that the protector plate comprises a pair of protrusions formed on both side edges of the protector plate. According to this construction, the equipment will come into contact with both side edges of the protector plate, and the protector plate that comes into contact with the user in the middle part thereof can be significantly bent in response to vibration and shock from the equipment. Note also that the protrusions may be formed not only on both side edges of the protector plate, but also on the upper and lower edges thereof.

It is preferable that at least a part of the protrusion is formed on a curved edge of the protector plate. According to this construction, the strength of the protector plate can be increased and comparatively strong vibrations and shocks can be sufficiently absorbed. In addition, the construction enables the protector plate to be reduced in thickness and weight, while maintaining the strength of the protector plate.

In an embodiment where the protector plate comprises a pair of protrusions formed on both side edges of the protector plate respectively, it is preferable that a lower part of each side edge is curved toward a center of the protector plate. According to this construction, the strength of the protector plate can be increased, and the user and his/her clothing can be prevented from catching on the protector plate.

It is preferable that the protrusion varies its cross-sectional shape along the edge of the protector plate. According to this construction, even if the protrusions have a uniform cross-sectional shape, the strength of the protector plate can be increased.

In one embodiment, the protrusion may be a folded portion in which a circumferential portion of the protector plate is folded with respect to a middle part of the protector plate. In this case, it is preferable that the fold angle of the folded portion varies along the edge of the protector plate. According to this construction, the cross-sectional shape of the protrusions can be changed along the edge of the protector plate, and the strength of the protector plate can be increased.

In another embodiment, the protrusion may be a curved portion in which a circumferential portion of the protector plate is curved with respect to the middle part of the protector plate. In this case, it is preferable that the curvature radius of the curved portion varies along the edge of the protector plate. According to this construction, the cross-sectional shape of the protrusions can be changed along the edge of the protector plate, and the strength of the protector plate can be increased.

Embodiment 1

Figure 2:
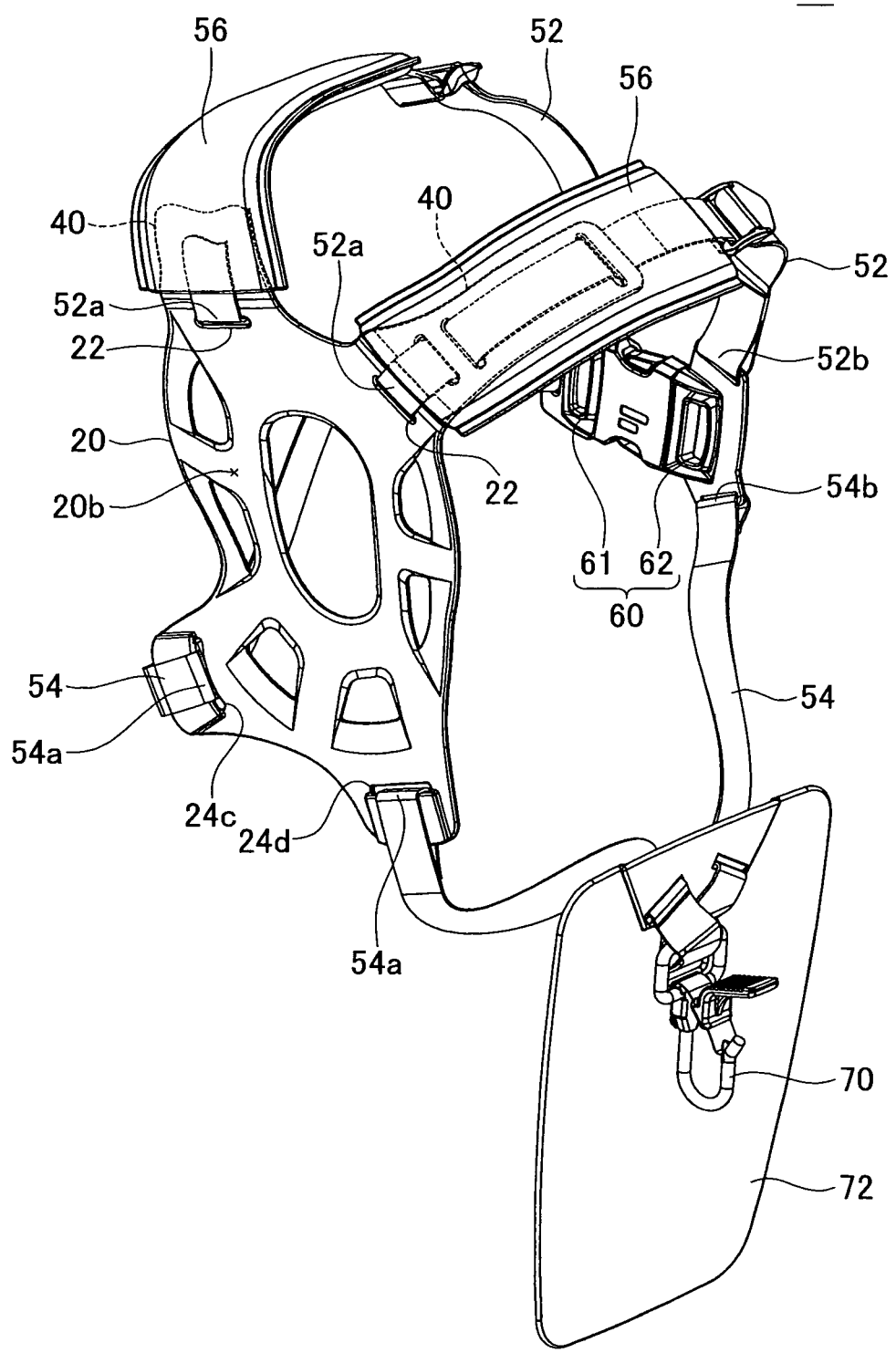
FIG. 2 is a perspective view showing the harness of Embodiment 1 from another viewpoint.

A harness 10 of Embodiment 1 will be described with reference to the drawings. FIG. 1 and FIG. 2 are perspective views showing the entire harness 10. The harness 10 is a mounting tool worn by the user in order to support a handheld power equipment such as a brush cutter 200 (see FIG. 15) or a blower.

As shown in FIG. 1 and FIG. 2, the harness 10 comprises a backplate 20. The backplate 20 is arranged on the back of the user (not shown in the drawings) when the user wears the harness 10. At this point, an inner surface 20a of the backplate 20 shown in FIG. 1 faces the back of the user, and an outer surface 20b of the backplate 20 shown in FIG. 2 is exposed rearward on the back of the user.

A pair of shoulder plates 40 is formed on the backplate 20. The pair of shoulder plates 40 extends from the upper portion of the backplate 20. The shoulder plates 40 are respectively arranged on both shoulders of the user when the user wears the harness 10. The shoulder plates 40 are integrally formed with the back plate 20 from the same material as the backplate 20. A shoulder pad 56 formed from a flexible material is placed on each of the shoulder plates 40.

The backplate 20 and the shoulder plates 40 are formed from polyethylene (one type of synthetic resin), and have a moderate degree of rigidity and flexibility. Note that the backplate 20 and the shoulder plates 40 are not limited to polyethylene, and can be formed from composite materials such as other synthetic resins or fiber-reinforced materials.

The backplate 20 and the shoulder plates 40 may be exposed to sunlight and heated to a high temperature when, for example, work is performed outdoors. Because of this, the backplate 20 and the shoulder plate 40 are preferably formed from a material having a low optical absorbance index. Materials having a low optical absorbance index include, for example, materials having transparent or semi-transparent light transmissivity, and colored (such as white) materials having high optical reflectance. With the harness 10 of the present embodiment, the backplate 20 and the shoulder plates 40 are formed from transparent polyethylene.

As shown in FIG. 1 and FIG. 2, the harness 10 comprises a pair of shoulder belts 52, a pair of waist belts 54, and a buckle 60 for connecting these together. The buckle 60 is constructed from a socket 61 and a plug 62 that can be attached to and detached from each other.

The shoulder belts 52 are respectively arranged on both shoulders of the user together with the shoulder plates 40 when the user wears the harness 10. The shoulder belts 52 are formed from synthetic fibers. The base ends 52a of the shoulder belts 52 are fixed to the backplate 20. Shoulder belt fixing holes 22 are formed in the backplate 20, and serve to fix the base ends 52a of the shoulder belts 52. In contrast, the distal ends 52b of the shoulder belts 52 are fixed to the socket 61 or the plug 62 of the buckle 60.

The waist belts 54 are respectively arranged on the waist of the user when the user wears the harness 10. The waist belts 54 are formed from the same synthetic fibers as the shoulder belts 52. The base ends 54a of the waist belts 54 are fixed to the backplate 20. Waist belt fixing holes 24c, 24d are formed in the backplate 20, and serve to fix the base ends 54a of the waist belts 54. In contrast, the distal ends 54b of the waist belts 54 are fixed to the socket 61 or the plug 62 of the buckle 60.

The buckle 60 is arranged on the waist of the user when the user wears the harness 10. One of the distal ends 52b of the shoulder belts 52 and one of the distal ends 54b of the waist belts 54 are fixed to the socket 61 of the buckle 60. The other distal end 52b of the shoulder belts 52 and the other distal end 54b of the waist belts 54 are fixed to the plug 62 of the buckle 60. When the harness 10 is to be worn by the user, the user will join the socket 61 and the plug 62 together, and connect the distal ends 52b, 54b of the belts 52, 54 together. In this way, the harness 10 will be fixed to the user. In contrast, when the user releases the connection between the socket 61 and the plug 62, the user can easily take off the harness 10.

As shown in FIG. 1 and FIG. 2, the harness 10 comprises an attachment 70 and a protector plate 80. The attachment 70 and the protector plate 80 are provided on the waist belt 54 that is arranged on the right side of the user. When the user wears the harness 10, the attachment 70 and the protector plate 80 are arranged on the outer side of the user's right thigh. The attachment 70 and the protector plate 80 are attached securely to the user by means of the backplate 20, the shoulder plates 40, and the plurality of belts 52, 54. Note also that the waist belt 54 arranged on the right side of the user is longer than the waist belt 54 arranged on the left side of the user. In this configuration, the attachment 70 and the protector plate 80 can be moved with respect to the user when the user is wearing the harness 10.

Figure 15:
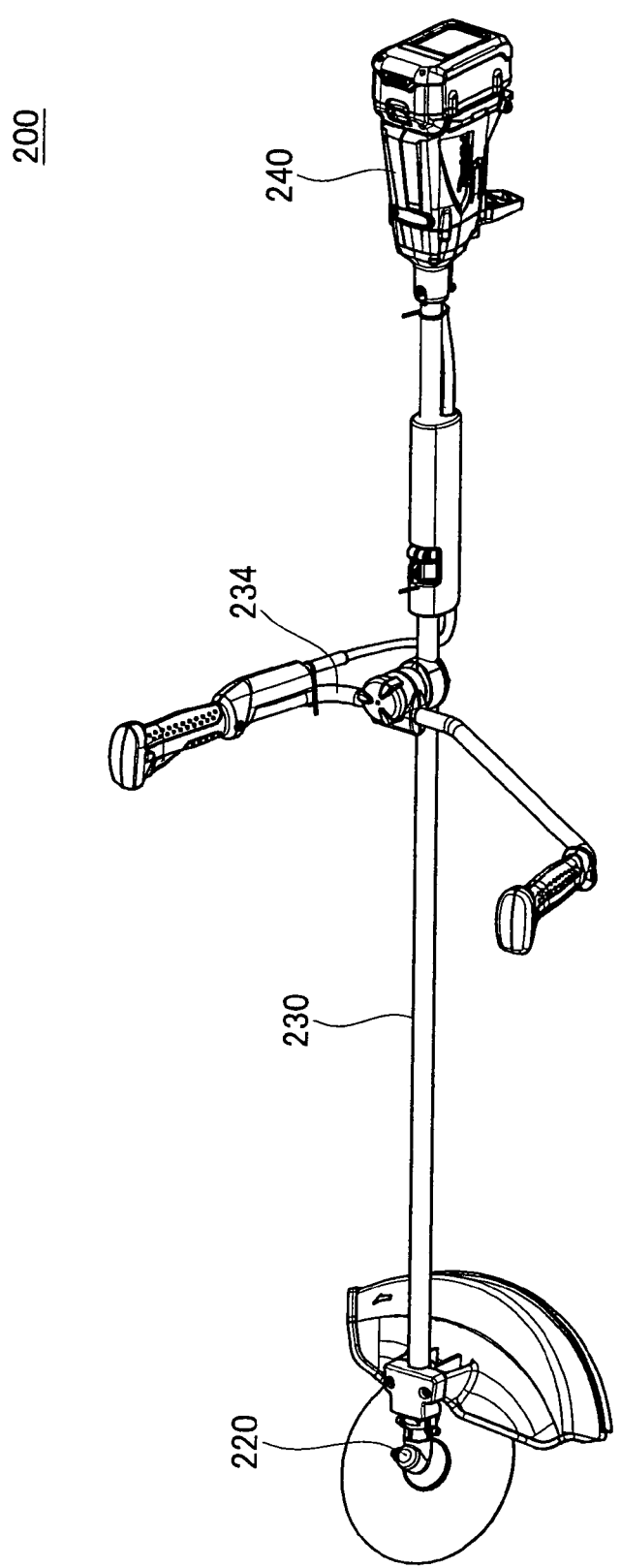
FIG. 15 shows an example of a brush cutter that is one type of handheld power equipment.

The attachment 70 is a metal tool used to attach the handheld power equipment (not shown in the drawings). The metal tool referred to here is not limited to objects formed from metal, and may be an object formed from other materials such as a synthetic resin. In the present embodiment, for example, a snap can be employed as the attachment tool 70, and the equipment can be easily attached to and detached from the attachment tool 70. As shown in FIG. 1, when the harness 10 is used with the brush cutter 200, an operation rod 230 of the brush cutter 200 will be attached to the attachment 70. Note that as shown in FIG. 15, a brush cutting unit 220 is provided on the front end of the operating rod 230 of the brush cutter 200, a main unit 240 is provided on the rear end of the operating rod 230, and a handle 234 is provided in the middle of the operating rod 230. The user will wear the harness 10, and by attaching the operation rod 230 to the attachment 70, and grasping the handle 234, the user can easily and stably hold the brush cutter 200.

The protector plate 80 is a plate-shaped member that is formed from a synthetic resin. The protector plate 80 of the present embodiment, for example, is formed from high density polyethylene (HDPE), and has a moderate degree of strength and flexibility (elasticity). Note that the protector plate 80 can also be formed from another synthetic material, a metal material, etc, or a material having other degrees of flexibility (elasticity). The material that forms the protector plate 80 is not limited to a specific material. The protector plate 80 is interposed between the brush cutter 200 (or another handheld power equipment) attached to the attachment 70 and the user wearing the harness 10, and will prevent the brush cutter 200 from coming into direct contact with the user. In this configuration, vibration and shock transmitted from the brush cutter 200 to the user will be mitigated.

Figure 3:
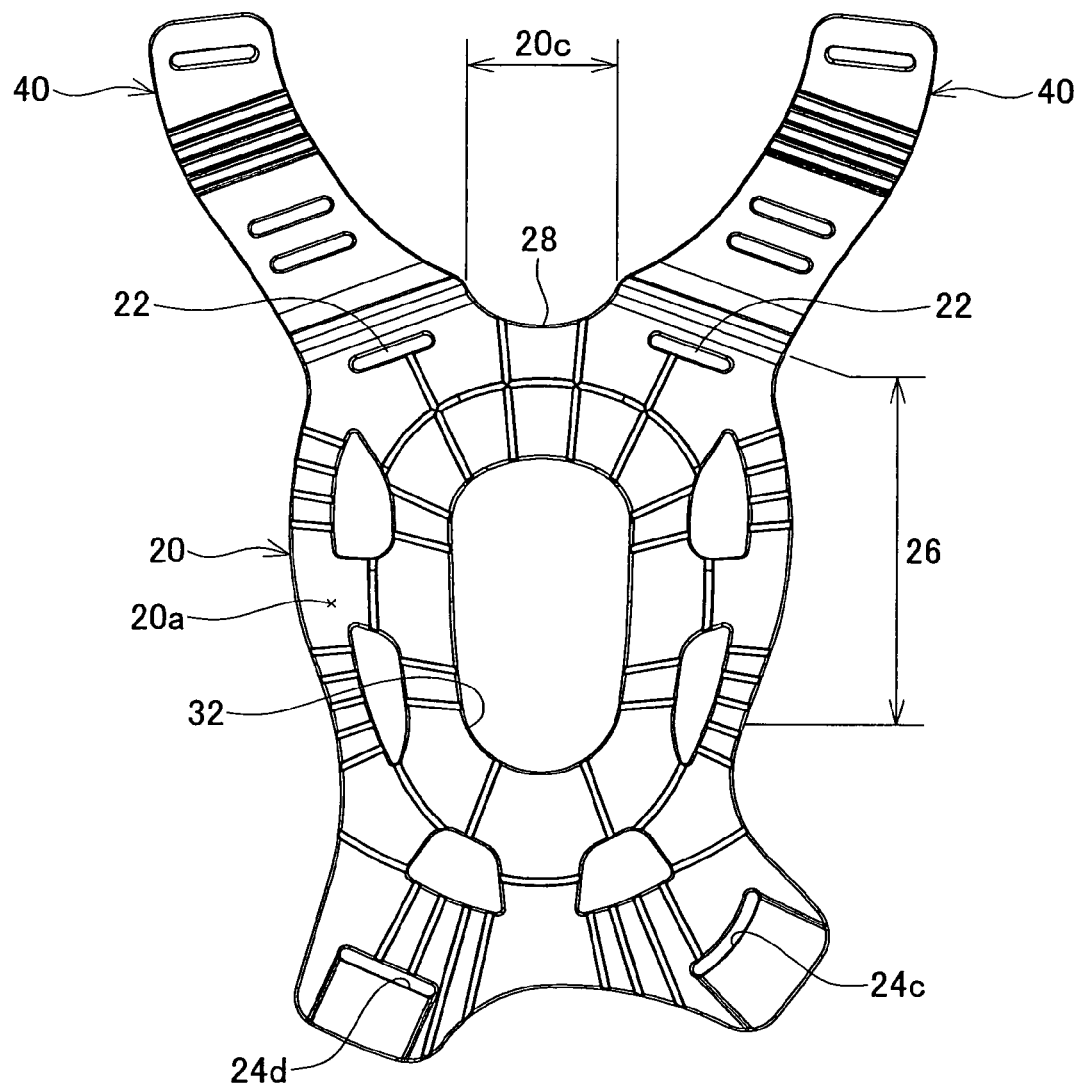
FIG. 3 is a front view of a backplate that includes a shoulder harness.
Figure 4:
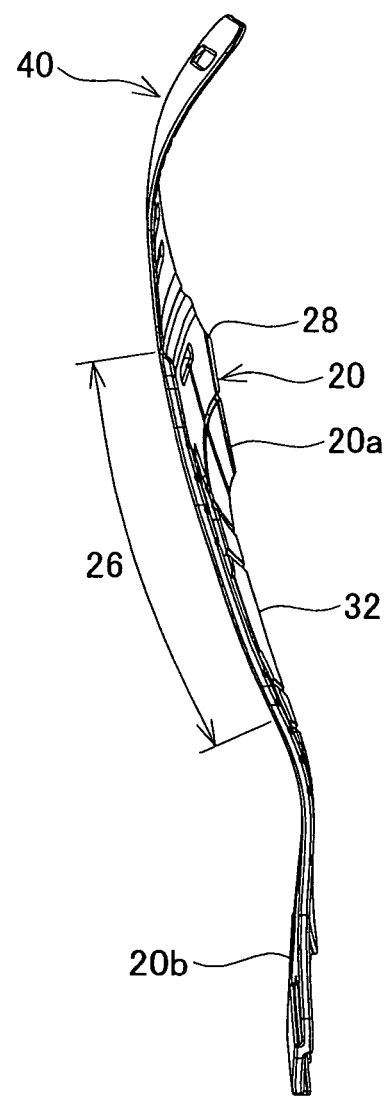
FIG. 4 is a left side view of the backplate that includes the shoulder harness.
Figure 5:
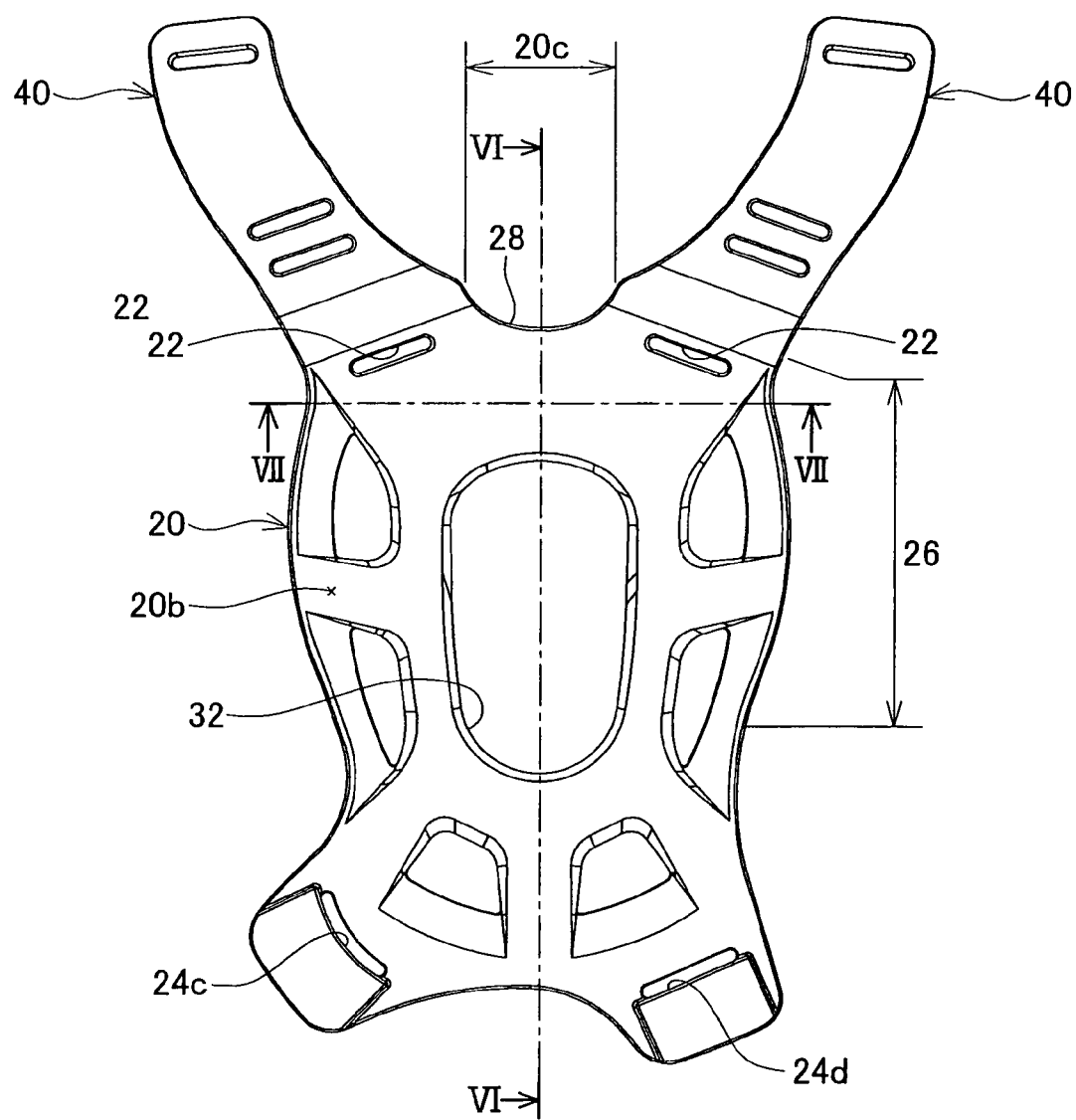
FIG. 5 is a rear view of the backplate that includes the shoulder harness.
Figure 6:
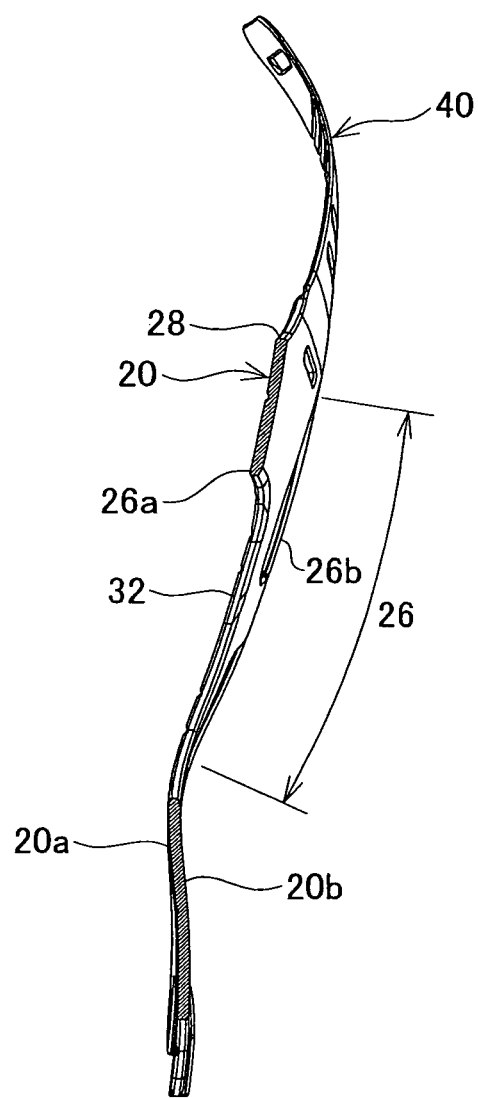
FIG. 6 is a cross-sectional view taken along line VI-VI of FIG. 5.
Figure 7:
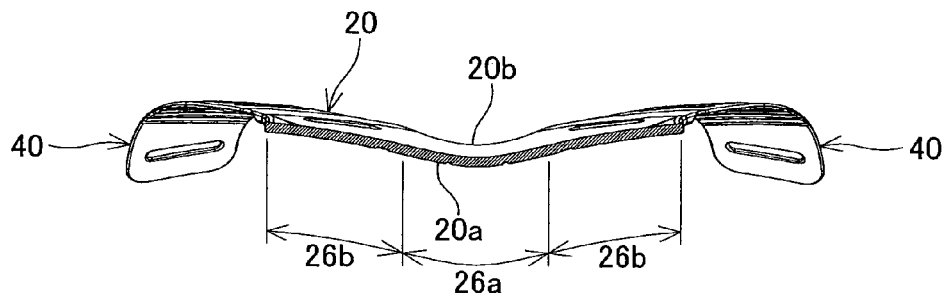
FIG. 7 is a cross-sectional view taken along line VII-VII of FIG. 5.

The overall construction of the harness 10 was described above. The construction of each part of the harness 10 will be described below. First, the shape of the backplate 20 will be described in detail with reference to FIG. 3, FIG. 4, FIG. 5, FIG. 6, and FIG. 7. Here, FIG. 3 shows a front view of the backplate 20 that includes the shoulder plates 40. FIG. 4 shows a left side view of the backplate 20 that includes the shoulder plates 40. FIG. 5 shows a rear view of the backplate 20 that includes the shoulder plates 40. FIG. 6 shows a cross-section taken along line VI-VI of FIG. 5. FIG. 7 shows a cross-section taken along line VII-VII of FIG. 5.

As shown in FIG. 3, FIG. 4, FIG. 5, FIG. 6, and FIG. 7, the backplate 20 has a characteristic curved surface shape so as to fit the back of the user. In particular, in a portion of the area of the backplate 20 in the height direction, a posteriorly-convex portion 26 is provided that is convex rearward with respect to the user (toward the outer surface 20*b* of the backplate 20) along the height direction of the backplate 20. Although there are individual differences, the back of the user is curved rearward in a convex shape so as to follow the curvature of the thoracic vertebrae. Accordingly, with the backplate 20 of the present embodiment, the posteriorly-convex portion 26 is provided on the upper portion of the backplate 20 so that the backplate 20 matches the shape of the user's back. By providing the backplate 20 with the posteriorly-convex portion 26, the backplate 20 will properly fit the back of the user. In addition, the portion below the posteriorly-convex portion 26 is convex forward with respect to the user (toward the inner surface 20*a* of the backplate 20) along the height direction of the backplate 20, and thus the entire backplate 20 is curved in an S shape along the height direction.

As shown in FIG. 6 and FIG. 7, with the posteriorly-convex portion 26 of the backplate 20, both side parts 26*b* thereof in the width direction are more convex rearward than the middle part 26*a* thereof in the width direction. Both side parts in the width direction of the user's back where the shoulder blades are located are more convex rearward than the middle part thereof in the width direction where the thoracic vertebrae are located. Because of this, as noted above, with the posteriorly-convex portion 26 of the backplate 20, the fit of the backplate 20 can be further improved by making both side parts 26*b* in the width direction more convex than the middle part 26*a* in the width direction.

Furthermore, as shown in FIG. 6 and FIG. 7, with the posteriorly-convex portion 26 of the backplate 20, the middle part 26*a* thereof is convex forward with respect to the user (the inner surface 20*a* side of the backplate 20), and both side parts 26*b* thereof are convex rearward with respect to the user (the outer surface 20*b* side of the backplate 20), in the width direction of the backplate 20. According to this construction, the shape of the posteriorly-convex portion 26 of the backplate 20 can be fitted to the curve from the thoracic vertebrae to the shoulder blades in the width direction of the user's back. In this configuration, the fit of the backplate 20 can be further improved.

As shown in FIG. 3 and FIG. 5, the upper edge 28 of the middle part 20*c* of the backplate 20 is curved so as to arch downward. Although there are individual differences, there is the localized bulge caused by the seventh cervical vertebrae in the upper portion of the user's back. Thus, when the backplate 20 comes into contact with the bulge caused by this seventh cervical vertebrae, a gap will be produced between the backplate 20 and the user's back, and the fit of the backplate 20 will decline significantly. In addition, the user will often feel a sense of discomfort. Because of this, by arching the upper edge 28 of the middle part 20*c* of the backplate 20 in the width direction downward so as to avoid the bulge caused by the seventh cervical vertebrae, the fit of the backplate 20 can be effectively improved.

A first opening 32 that extends in the height direction of the backplate 20 is formed in the middle part 20*c* of the backplate 20 in the width direction. Although there are individual differences, there is one or more localized bulges caused by the thoracic vertebrae in the middle part of the user's back in the width direction. Thus, when the backplate 20 comes into contact with the bulge caused by the thoracic vertebrae, a gap will be produced between the backplate 20 and the user's back, and the fit of the backplate 20 will decline significantly. In addition, the user will often feel the sense of discomfort under such circumstances. Because of this, by forming the first opening 32 in the middle part 20*c* of the backplate 20 in the width direction so as to avoid the bulge caused by the thoracic vertebrae, the fit of the backplate 20 can be effectively improved. Note also that a portion of the first opening 32 provided in the middle portion 20*c* of the backplate 20 reaches the area of the posteriorly-convex portion 26.

Due to the shape of the backplate 20 described above, the backplate 20 will fit the back of the user when the user wears the harness 10. In this configuration, the user can stably support handheld power equipment.

Figure 8:
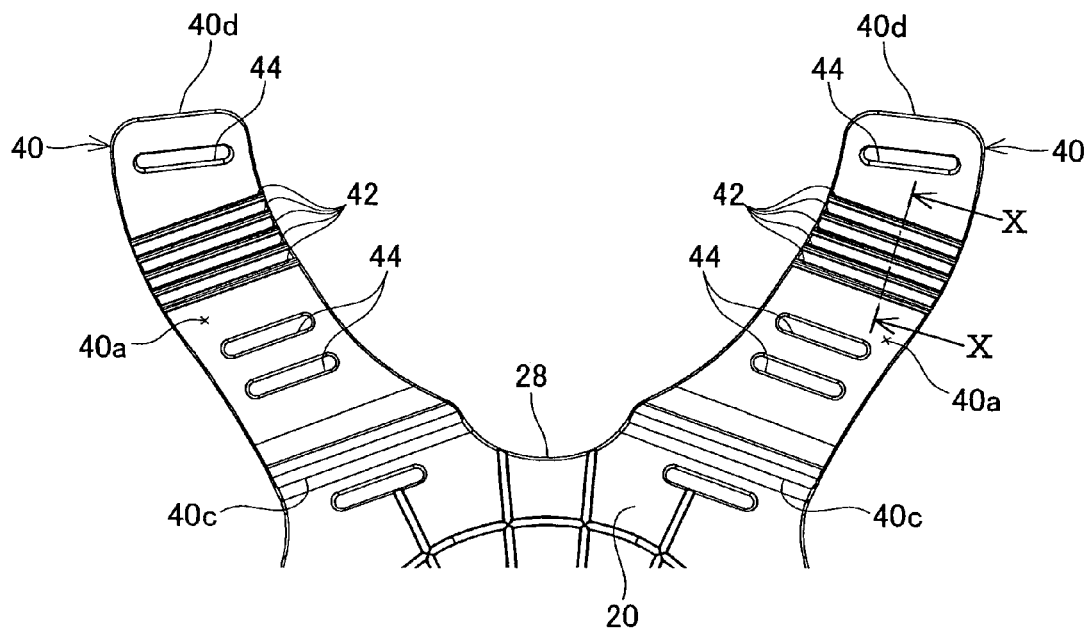
FIG. 8 is a front view that shows shoulder plates.
Figure 9:
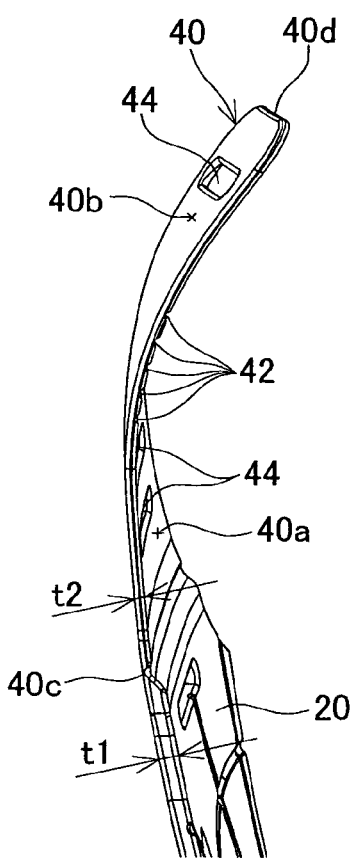
FIG. 9 is a left side view that shows the shoulder plates.
Figure 10:
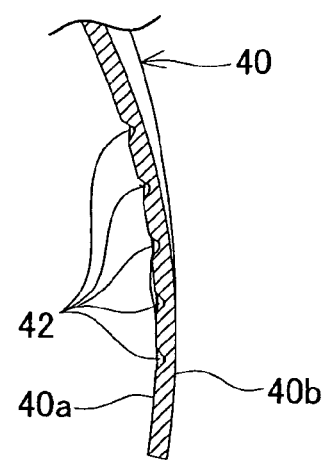
FIG. 10 is a cross-sectional view taken along line X-X of FIG. 8.

Next, the construction of the shoulder plates 40 will be described in detail with reference to FIG. 8, FIG. 9, and FIG. 10. FIG. 8 shows a front view of the shoulder plates 40, FIG. 9 shows a left side view of the shoulder plates 40, and FIG. 10 shows a cross-sectional view taken along line X-X of FIG. 8. The harness 10 is constructed so that the shoulder plates 40 are formed integrally with the backplate 20, the load on the shoulders of the user will be distributed to the back of the user via the backplate 20, and the burden on the shoulders of the user will be reduced. In particular, the harness 10 is constructed so that the shoulder plates 40 have a length that extends past the uppermost point on the shoulders of the user and to the front of the user, and thus much of the load on the shoulders of the user will be distributed onto the back of the user.

A plurality of belt loop holes 44 is formed in the shoulder plates 40 so that the shoulder belts 52 can pass therethrough. The state in which the shoulder belts 52 are passed through the belt loop holes 44 of the shoulder plates 40 is shown in FIG. 2. By passing the shoulder belts 52 through the belt loop holes 44 of the shoulder plate 40, the shoulder belts 52 will be prevented from coming off the shoulder plates 40. As shown in FIG. 2, the shoulder plates 40 are positioned below the shoulder belts 52 (except a portion thereof), and are interposed between the user and the shoulder belts 52. In this configuration, the load placed on the shoulder belts 52 will be transmitted to the backplate 20 via the shoulder plates 40. Thus, the load transmitted to the backplate 20 will be distributed to the back of the user by means of the backplate 20 that fits the back of the user. Here, the shoulder belts 52 are fixed to the backplate 20, but are not fixed to the shoulder plates 40. In other words, even if the shoulder belts 52 are pulled strongly, the tensile load will not be placed onto the shoulder plates 40. Thus, even if a strong load is placed on the shoulder belts 52, the shoulder plates 40 will not break. In addition, even if the shoulder plates 40 break, the harness 10 will not fall off from the user because the shoulder belts 52 are fixed to the backplate 20.

A plurality of grooves 42 is formed in the inner surfaces 40*a* of the shoulder plates 40. The plurality of grooves 42 extends in a direction that intersects with the longitudinal direction of the shoulder plate 40. In other words, the plurality of grooves 42 extends in the width direction of the shoulder plates 40. By providing the grooves 42 in the shoulder plates 40, the shoulder plates 40 can bend more flexibly along the shoulders of the user. The fit of the shoulder plates 40 can be improved, and the load applied to the shoulders of the user can be reliably received by the shoulder plates 40. Here, as shown in FIG. 10, the grooves 42 have a shape in cross-section that is approximately triangular. Here, the grooves 42 formed in the shoulder plates 40 are not limited to the inner surface 40*a*, but may also be formed in the outer surface 40*b* on the opposite side thereof. Regardless of which surface 40*a* or 40*b* the grooves 42 are provided, the shoulder plates 40 can be easily deformed, and thus the fit can be improved. Note also that, as shown in FIG. 9, the shoulder plates 40 are convex toward the outer surface 40*b* side even in the unloaded state.

As shown in FIG. 9, the thickness t2 of the shoulder plates 40 is less than the thickness t1 of the backplate 20. In other words, the thickness t2 of the shoulder plates 40 is comparatively small, and thus the flexibility of the shoulder plates 40 is higher. In this configuration, the fit of the shoulder plates 40 is improved. In contrast, the thickness t1 of the backplate 20 is comparatively large, and thus the durability of the backplate 20 is higher. In this configuration, the load transmitted from the shoulder plates 40 will be distributed to the entire backplate 20.

As shown in FIG. 8, the shoulder plates 40 are outwardly convex in the width direction from the bases 40*c* positioned on the backplate 20 side, along the direction toward the distal ends 40*d* on the opposite sides thereof. According to this construction, when the shoulder plates 40 are arranged on the shoulders of the user, a sufficient amount of space will be formed between the shoulder plates 40 and the user's neck. In this configuration, the shoulder plates 40 will avoid interference with the user's neck, and the fit of the shoulder plates 40 can be improved.

Due to the construction of the shoulder plates 40 described above, when the user wears the harness 10, the shoulder plates 40 will fit the shoulders of the user correctly, and the load on the user's shoulders will be markedly reduced.

Figure 11:
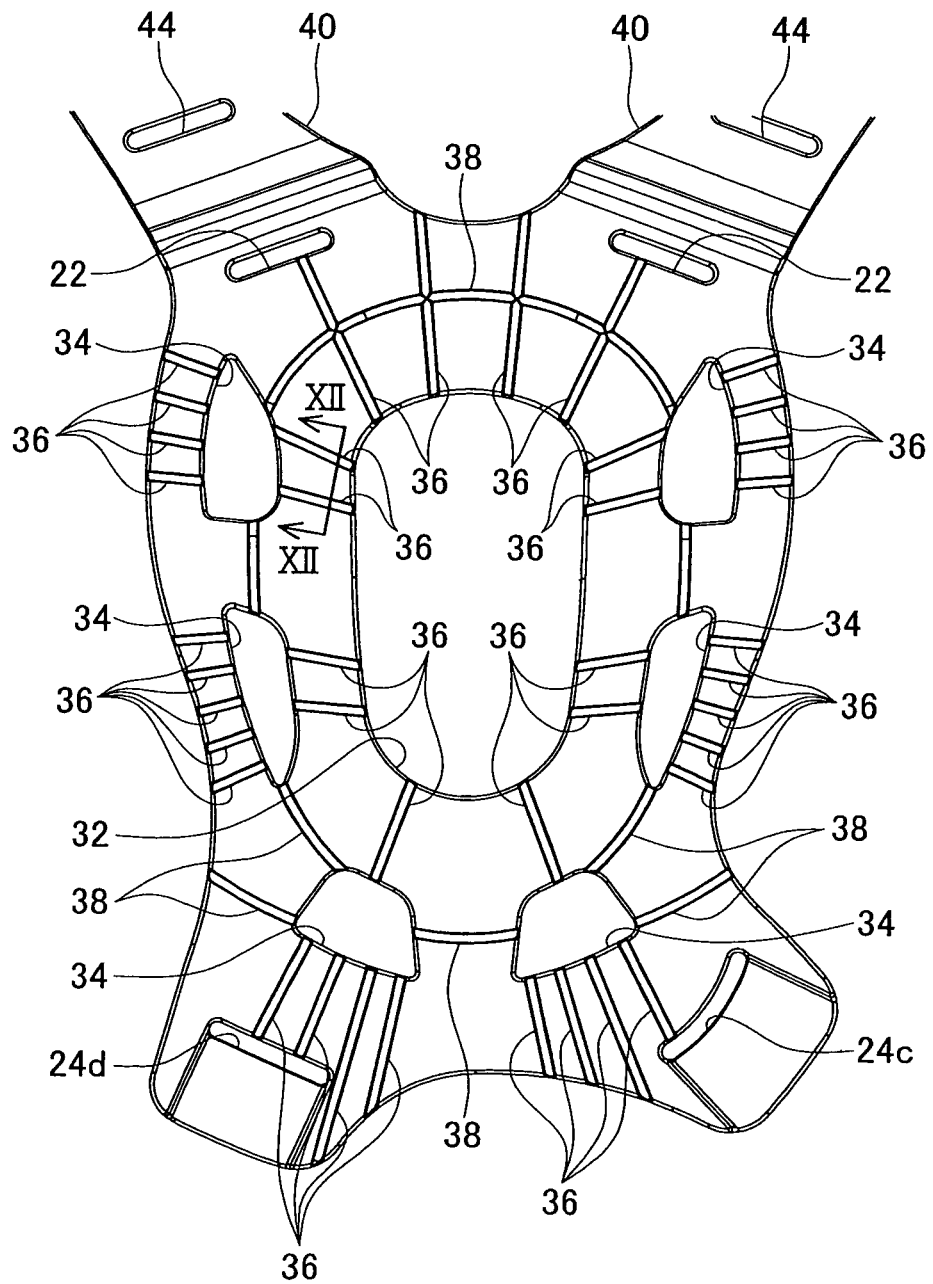
FIG. 11 is a front view of the backplate excluding the shoulder plates.
Figure 12:
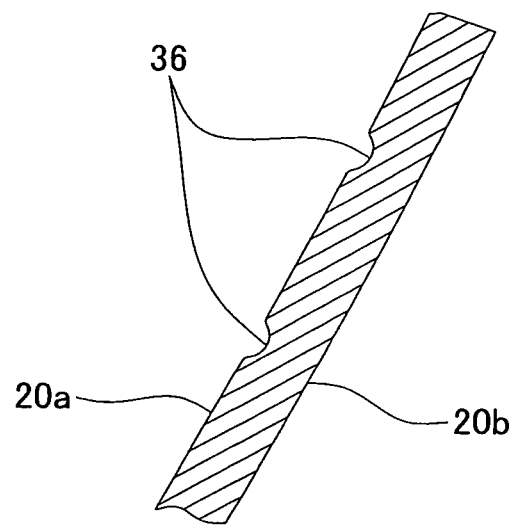
FIG. 12 is a cross-sectional view taken along line XII-XII of FIG. 11.

Next, the ventilation structure of the backplate 20 will be described in detail with reference to FIG. 11 and FIG. 12. FIG. 11 shows a front view of the backplate 20 without the shoulder plates 40, and FIG. 12 shows a cross-sectional view taken along line XII-XII in FIG. 11. When the backplate 20 is arranged on the back of the user, the inner surface 20*a* of the backplate 20 will face the user's back and be in close contact with it. Because of this, heat and moisture will be easily trapped between the backplate 20 and the back of the user, and the user will often feel the sense of discomfort felt by the user. Accordingly, in order to improve the ventilation between the backplate 20 and the back of the user, the structure described below will be employed in the backplate 20 of the present embodiment.

As shown in FIG. 11, a plurality of ventilation grooves 36, 38 is formed in the inner surface 20*a* of the backplate 20. In this configuration, even if the backplate 20 is in close contact with the back of the user, air passages will be formed by means of the ventilation grooves 36, 38 between the backplate 20 and the back of the user. In this configuration, heat and moisture can be prevented from being trapped between the backplate 20 and the back of the user.

Here, both ends of each of the ventilation grooves 36, 38 extend to the edge of the backplate 20. In this configuration, when the backplate 20 is arranged on the back of the user, the ends of the ventilation grooves 36, 38 will be exposed to the outside. In other words, even if the inner surface 20*a* of the backplate 20 is in close contact with the back of the user, the ventilation grooves 36, 38 will continue to communicate with the external air. In this configuration, much of the heat and moisture can be discharged from between the backplate 20 and the back of the user. Note that the edge of the backplate 20 noted above means the outer circumferential edge of the backplate 20, the edge of the openings formed in the backplate 20, etc.

As shown in FIG. 11, the first opening 32 positioned approximately in the middle part of the backplate 20, and a plurality of second openings 34 arranged around the periphery of the first opening 32, are formed in the backplate 20. In this configuration, heat and moisture generated on the back of the user will be discharged to the outside through the openings 32, 34. Furthermore, because the ventilation grooves 36, 38 are connected to the openings 32, 34, heat and moisture generated on the back of the user will be discharged through the ventilation grooves 36, 38 to the openings 32, 34, and from the openings 32, 34 to the outside.

The plurality of ventilation grooves 36, 38 is divided broadly into a plurality of first ventilation grooves 36 that extends in an approximate radial pattern with respect to the first opening 32, and a plurality of second ventilation grooves 38 that extends in an approximate circular pattern with respect to the first opening 32. Each of the first ventilation grooves 36 is a groove that extends in a linear pattern from the first opening 32 to the outer circumferential edge of the backplate 20, from the first opening to the second openings 34, or from the second openings 34 to the outer circumferential edge of the backplate 20. In contrast, each of the second ventilation grooves 38 is a groove that extends in an arcuate pattern from one of the second openings 34 to another of the second openings 34. Thus, by combining the first ventilation grooves 36 that extend in a radial pattern with the second ventilation grooves that extend in a circular pattern, the ventilation between the backplate 20 and the back of the user will be effectively improved.

In addition, in the present embodiment, some of the first ventilation grooves 36 and some of the second ventilation grooves 38 are formed so as to intersect with each other. Some of the ventilation grooves 36, 38 formed on the inner surface 20*a* of the backplate 20 will often be blocked by the user's clothing or the like. For example, when the first ventilation grooves 36 are blocked, the ability of the first ventilation grooves 36 to ventilate will be severely reduced. However, if the second ventilation grooves 38 intersect with the first ventilation grooves 36, and the second ventilation grooves 38 communicate with the first ventilation grooves 36, the ability of the blocked first ventilation grooves 36 will be complemented by the second ventilation grooves in communication therewith.

As shown in FIG. 12, the first ventilation grooves 36 have a shape in cross-section that is approximately semicircular. In addition, although not shown in the drawings, the second ventilation grooves 38 also have a shape in cross-section that is approximately semi-circular, like that of the first ventilation grooves 36. When the ventilation grooves 36, 38 are formed in the backplate 20, the thickness of the backplate 20 at the positions at which the ventilation grooves 36, 38 are formed will be reduced, and thus stress may concentrate and significant warping may easily occur. At this point, if the ventilation grooves 36, 38 are approximately semicircular in cross section, the localized concentration of stress produced on the backplate 20 can be mitigated, and the durability of the backplate 20 can be increased.

Due to the construction of the backplate 20 described above, ventilation between the backplate 20 and the back of the user will be improved, and the feeling of discomfort felt by the user due to the backplate 20 being in close contact will be greatly reduced.

Figure 13:
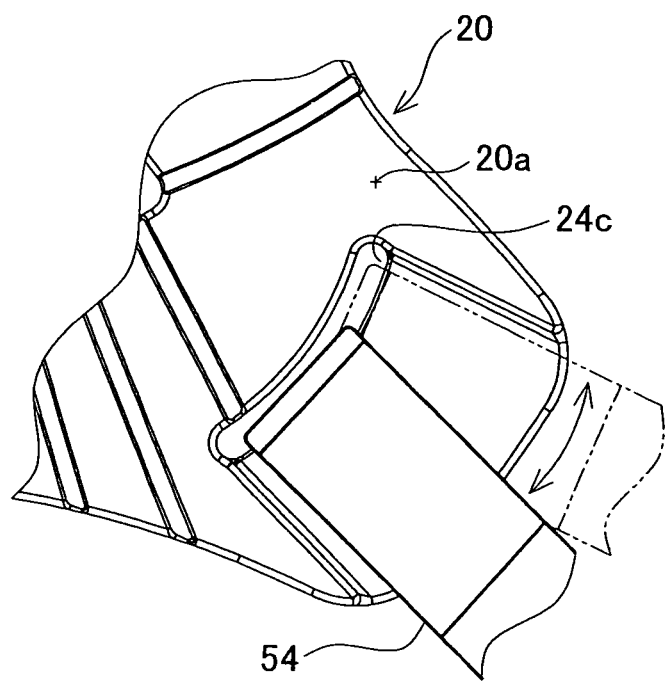
FIG. 13 is a view showing waist belt fixing holes of the backplate.

Next, the construction of waist belt fixing holes 24*c*, 24*d* will be described with reference to FIG. 13. As described previously, waist belt fixing holes 24*c*, 24*d* are formed in the backplate 20, and serve to fix the base ends 54*a* of the waist belts 54. FIG. 13 shows the left side of the waist belt fixing hole 24*c* in which the waist belt 54 arranged on the left waist of the user is fixed. As shown in FIG. 13, the waist belt fixing hole 24c on the left side is different from the waist belt fixing hole 24d on the right side, and has an opening that is curved in an arcuate shape.

The waist belt 54 on the left side must be tightened securely when the harness 10 is to be worn. When the waist belt 54 is tightened, the position of the waist belt 54 will change in response to the attachment position of the buckle 60 due to the differences in the position etc. of the waist of the user. At this point, if the waist belt fixing hole 24c is curved in the arcuate shape, the waist belt 54 can change its direction in response to the change in the position of the waist belt 54. Thus, the user can securely tighten the waist belt 54 without creating creases or slacks in the waist belt 54. In contrast to this, the waist belt fixing hole 24d on the right side does not have such arcuate hole in order to stabilize the attachment 70 and the protector plate 80.

Embodiment 2

Figure 14:
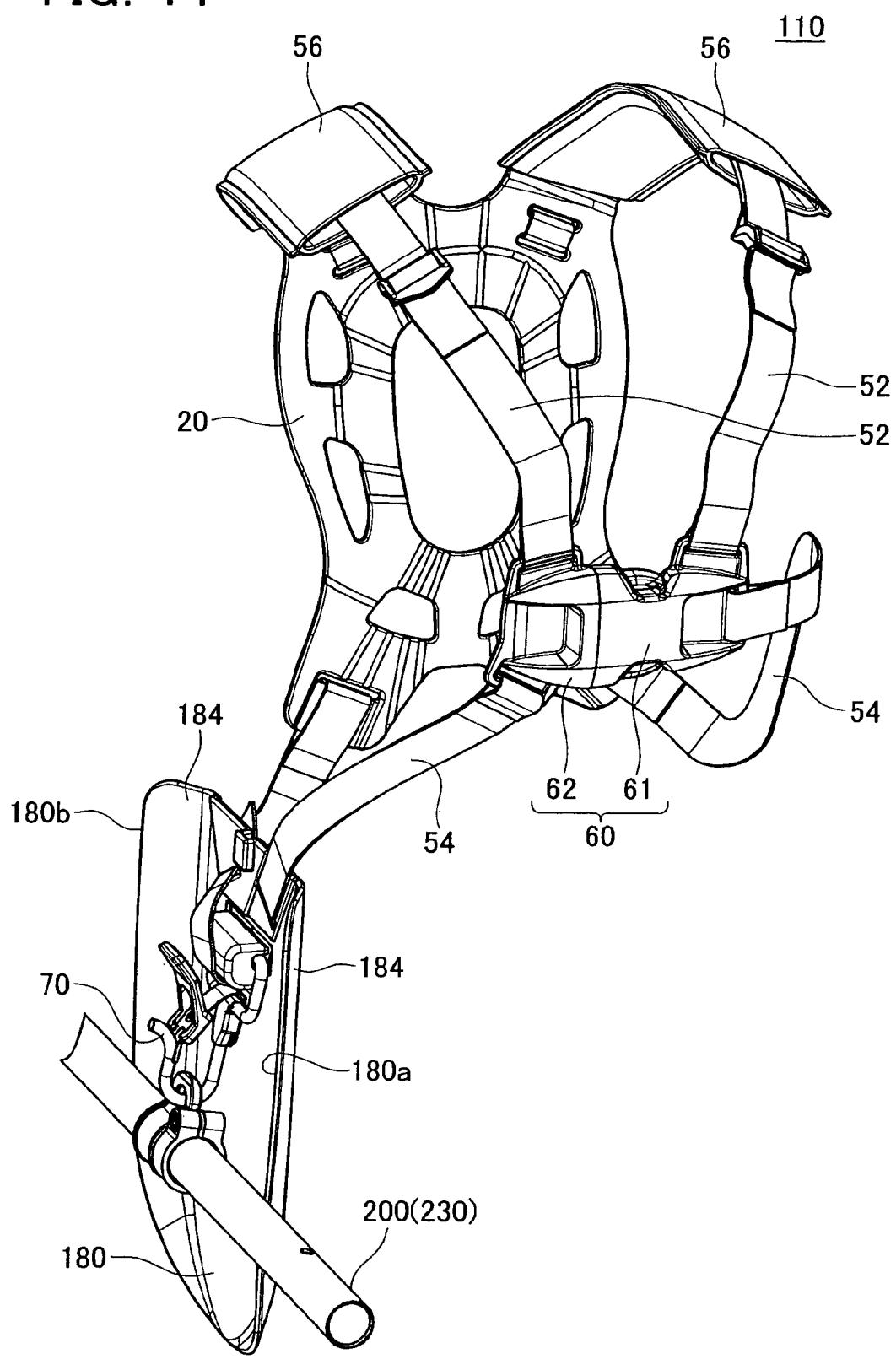
FIG. 14 is a perspective view of a harness of Embodiment 2.

A harness 110 of Embodiment 2 will be described with reference to the drawings. FIG. 14 is a perspective view showing the entire harness 110. The harness 110 is a mounting tool worn by the user, and serves to hold the brush cutter 200 shown in FIG. 15. Note that FIG. 2 shows an example of the brush cutter 200, and usage of the harness 110 is not limited to the brush cutter 200 shown in FIG. 15. Furthermore, the harness 110 is not limited to the brush cutter 200, and for example can also be used with other types of handheld power equipment such as a blower.

Compared to the harness 10 of Embodiment 1, the shape of a protector plate 180 is changed on the harness 110 of Embodiment 2. In contrast, with regard to the other construction of the backplate 20 etc., the harness 110 is substantially the same as the harness 10 of Embodiment 1. Thus, the shape, characteristics, and function of the protector plate 180 will be described in detail, but with regard to the other construction, the description of Embodiment 1 will be relied upon.

As shown in FIG. 14, protrusions 184 are formed along both side edges 180a, 180b of the protector plate 180, rather than using a flat plate material along the entire length thereof. The protrusions 184 protrude toward the brush cutter 200 attached to the attachment 30. In this configuration, the operation rod 130 of the brush cutter 200 will contact the protector plate 180 at the protrusions 184. Here, with the position of the protector plate 10 when the harness 110 is worn by the user being used as a reference, both side edges 180a, 180b of the protector plate 180 means the portions on the circumferential edges of the protector plate 180 that are positioned on both sides thereof in the horizontal direction.

Figure 16:
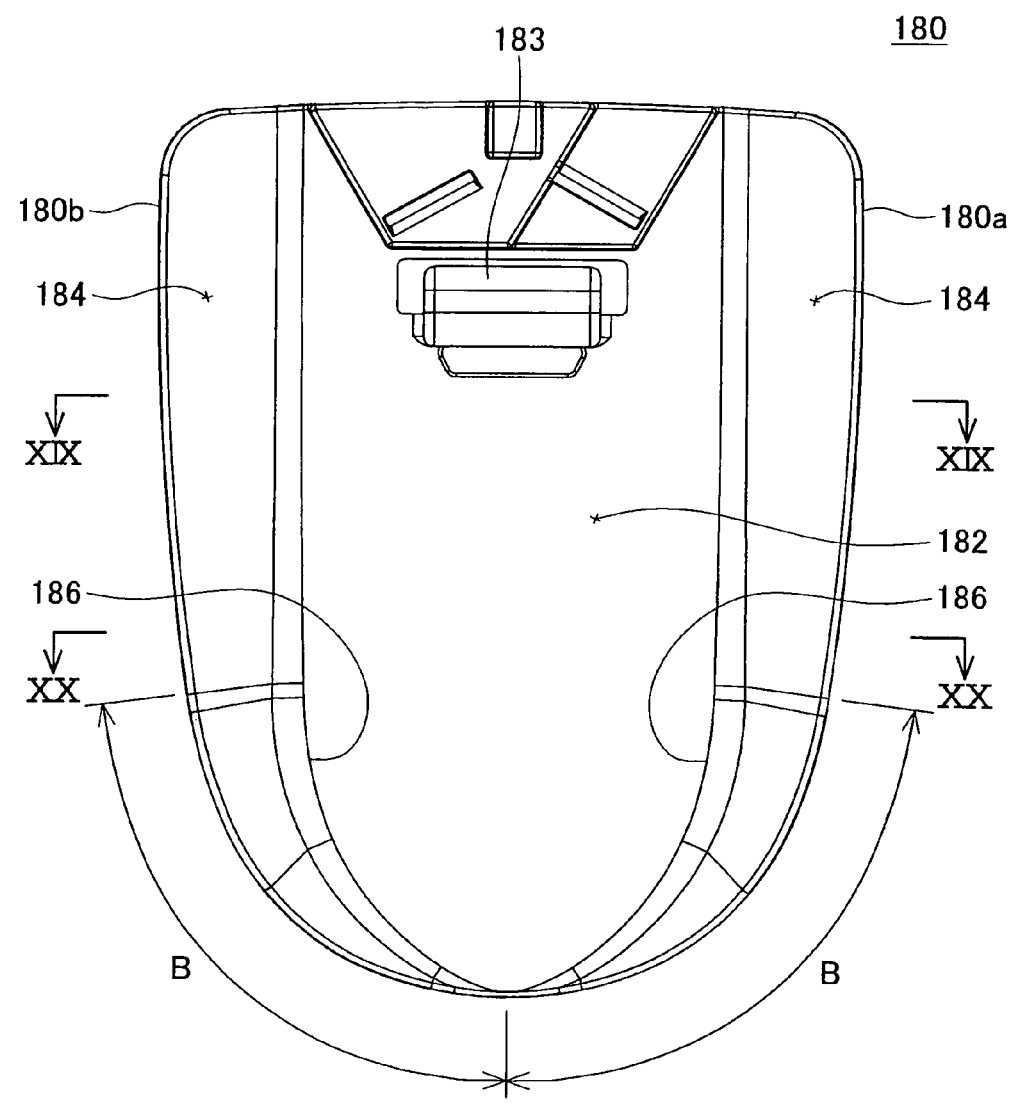
FIG. 16 is a front view of a protector plate of Embodiment 2.
Figure 17:
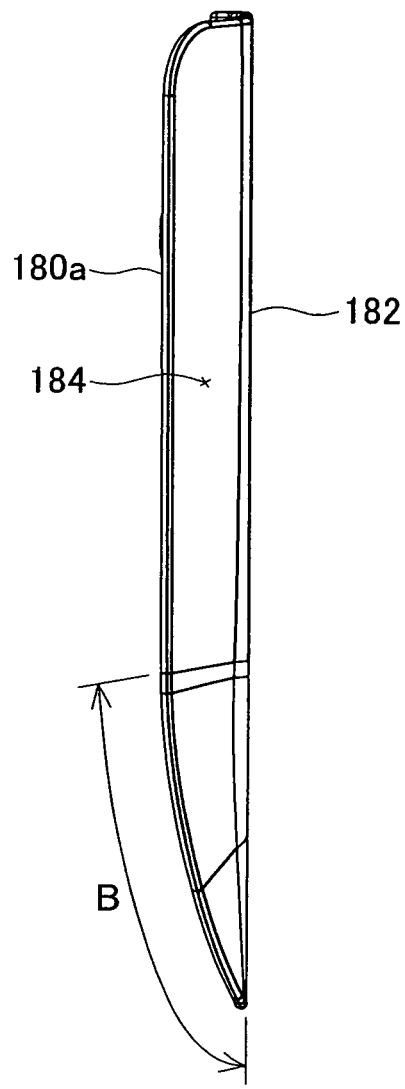
FIG. 17 is a right side view of the protector plate of Embodiment 2.
Figure 18:
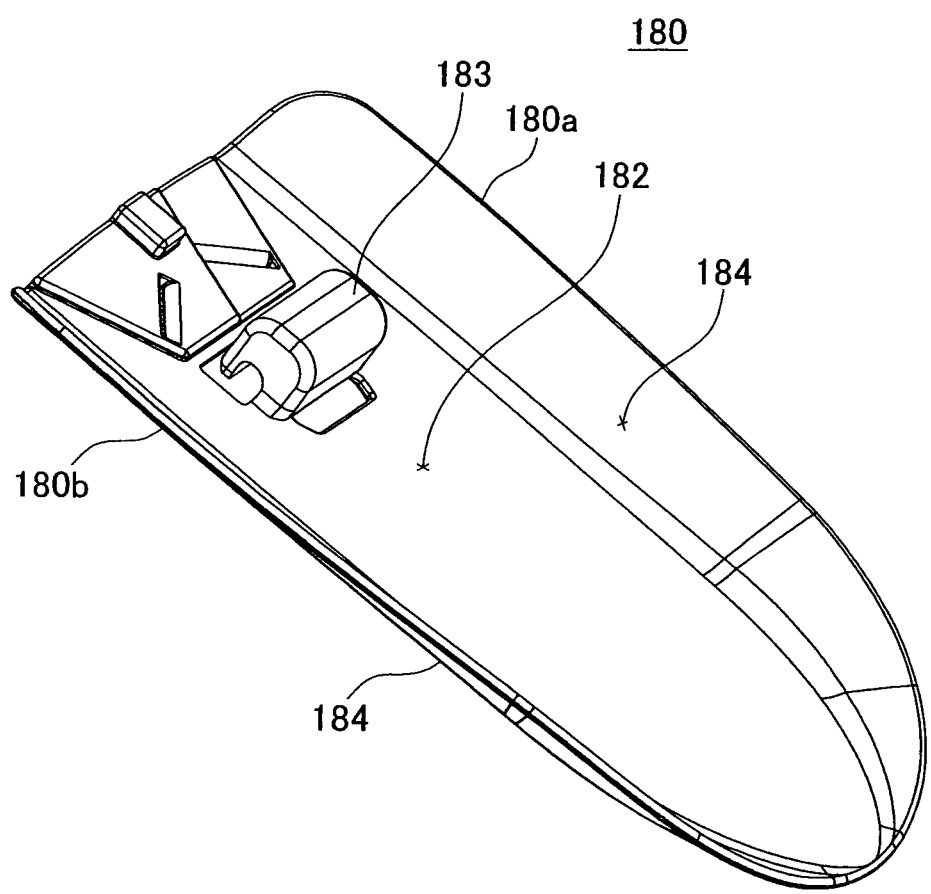
FIG. 18 is a perspective view of the protector plate of Embodiment 2.

FIG. 16 shows a front view of the protector plate 180, FIG. 17 shows a right side view of the protector plate 180, and FIG. 18 shows a perspective view of the protector plate 180. As described previously, protrusions 184 are formed along both side edges 180a, 180b of the protector plate 180. In contrast, a middle part 182 positioned between the protrusions 184 on both sides is flat. A hook shaped part 183 that holds the attachment 30 is formed on the flat middle portion 182.

As shown in FIG. 16, when the protector plate 180 is viewed from the front, each side edge 180a, 180b of the protector plate 180 is curved, and the protrusions 184 noted above are formed on each curved side edge 180a, 180b. According to this construction, the strength of the protector plate 180 can be increased, even when the protrusions 184 are formed on linear circumferential edges. In addition, the lower side part B of each side edge 180a, 180b of the protector plate 180 is curved toward the middle of the protector plate 180. According to this construction, the user and his/her clothing can be prevented from catching on the protector plate 180.

Figure 19:
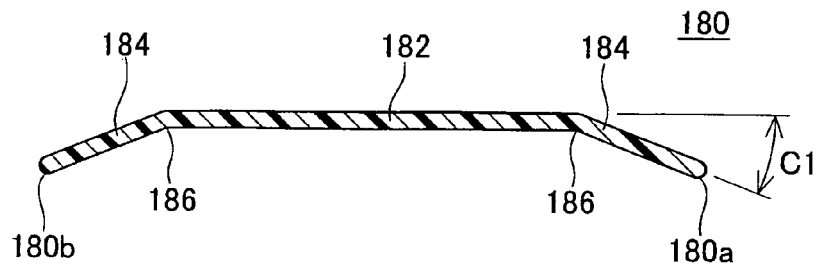
FIG. 19 is a cross-sectional view taken along line XIX-XIX of FIG. 16, and shows the shape in cross-section of the protector plate of Embodiment 2.
Figure 20:
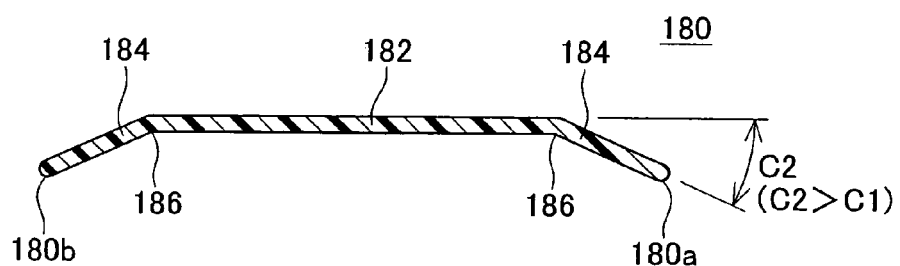
FIG. 20 is a cross-sectional view taken along line XX-XX of FIG. 16, and shows the shape in cross-section of the protector plate of Embodiment 2.

As shown in FIG. 19 and FIG. 20, with the protrusions 184 of the present embodiment, the side edge portions that include the side edges 180a, 180b of the protector plate 180 are folded portions that are folded with respect to the middle part 182. Here, when the cross-section shown in FIG. 19 is compared to the cross-section shown in FIG. 20, the angles C1, C2 at which the protrusions 184 are folded differ, and the angle C1 is larger than the angle C2. In other words, the fold angle of the protrusions 184 varies along the side edges 180a, 180b, and this value increases the further downward one goes. As a result, the cross-sectional shape of the protrusions 184 continuously vary along the side edges 180a, 180b. According to this construction, even if the protrusions 184 have a uniform cross-sectional shape, the strength of the protector plate 180 can be increased. By increasing the strength of the protector plate 180, the necessary strength and flexibility (elasticity) can be maintained, while reducing the thickness and weight of the protector plate 180.

In addition, as shown in FIG. 16, a fold line 186 positioned on the border between the protrusions 184 and the middle part 182 is also curved along the side edges 180a, 180b of the curved protector plate 180. If the fold line 186 is curved, the strength of the protector plate 180 can be increased, even when the fold line 186 extends in a straight line.

Figure 21:
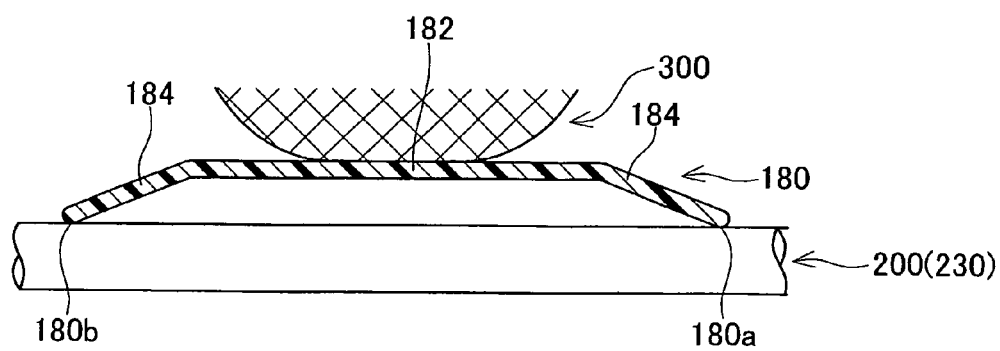
FIG. 21 is a cross-sectional view showing the protector plate between a user and the brush cutter.

FIG. 21 shows the protector plate 180 interposed between a user 300 and the brush cutter 200 (cross-sectional view). As shown in FIG. 21, the brush cutter 200 is in contact with the protrusions 184 formed on both edges 180a, 180b of the protector plate 180, but is not in contact with the middle part 182 of the protector plate 180. In contrast, the user 300 will be in contact with the middle part 182 of the protector plate 180 from the opposite side of the brush cutter 200. In other words, with the protector plate 180 of the present embodiment, the area within the protector plate 180 in which the brush cutter 200 comes into contact is different than the area thereof in which the user 300 comes into contact. In this configuration, vibration and shock transmitted from the brush cutter 200 via the protector plate 180 will be markedly mitigated. Furthermore, the protector plate 180 can absorb vibration and shock by passively bending in response to that vibration and shock from the brush cutter 200. In other words, the protector plate 180 can function as a plate spring between the brush cutter 200 and the user 300. According to this protector plate 180, vibration and shock from the brush cutter 200 can be absorbed, and the transmission of that vibration and shock to the user 300 can be inhibited, without adding a shock absorbing part such as a pad. However, an additional shock absorbing part such as a pad may further be provided on the protector plate 180 in accordance with user's needs. In this case, vibration and shock from the brush cutter 200 will be absorbed due to both the shape of the protector plate 180 noted above and the shock absorbing part.

Specific embodiments of the present teachings are described above, but those merely illustrate some representative possibilities for utilizing the teachings and do not restrict the claims thereof. The subject matter set forth in the claims includes variations and modifications of the specific examples set forth above.

Figure 22:
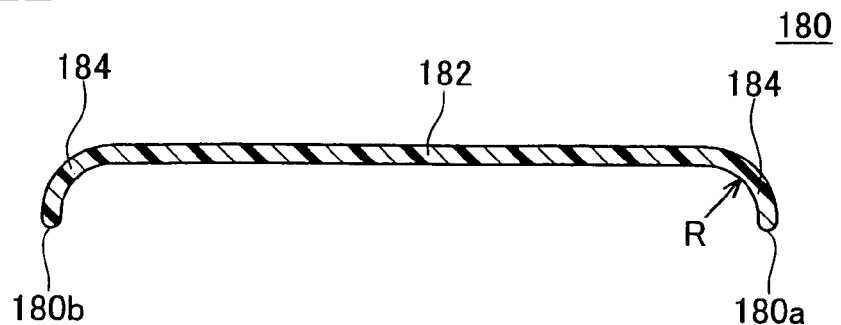
FIG. 22 is a cross-sectional view showing a modification of the cross-sectional view of the protector plate.
Figure 23:
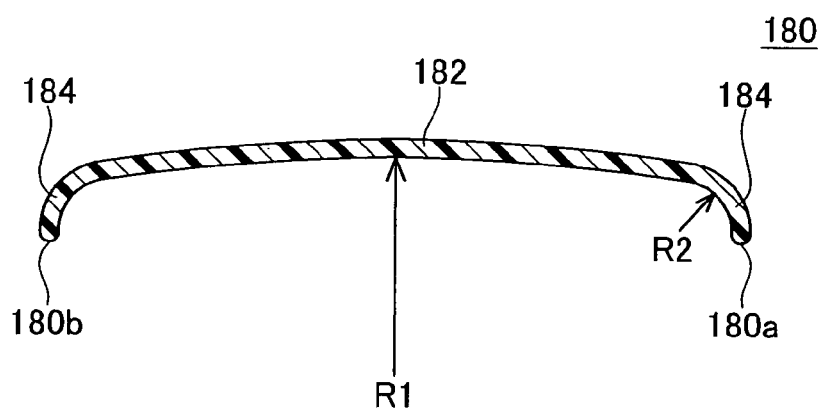
FIG. 23 is a cross-sectional view showing a modification of the cross-sectional view of the protector plate.

For example, as shown in FIG. 22, the protrusions 184 of the protector plate 180 may be curved portions in which the protector plate 180 is curved. In this case, it is preferable that the curvature radius R varies along each side edge 180a, 180b. According to this construction, the cross-sectional shape of the protrusions 184 varies along each side edge 180a, 180b, and thus the strength of the protector plate 180 can be increased. In addition, as shown in FIG. 23, the entire protector plate 180 may be curved. In this case, the strength to flexibility ratio of the protector plate 180 can be adjusted by making the curvature radius R1 of the middle part 182 different than the curvature radius R2 of the protrusions (side edge portions) 184.

Figure 24:
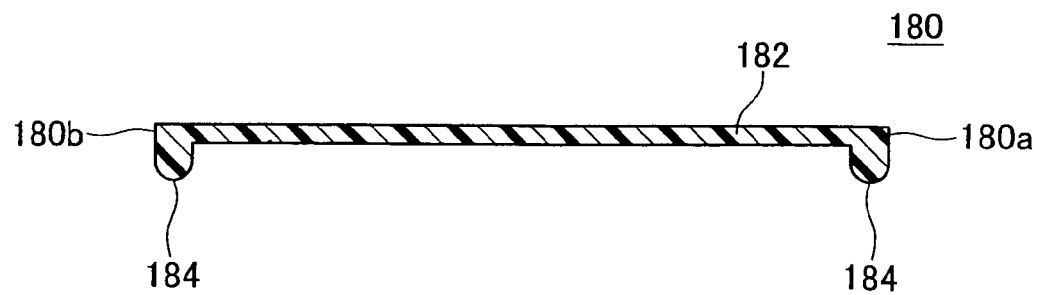
FIG. 24 is a cross-sectional view showing a modification of the cross-sectional view of the protector plate.

Additionally, the protrusions 184 of the protector plate 180 is not limited to those in which the protector plate 180 is folded or curved, and as shown in FIG. 24, the protrusions 184 can also be formed by making the thickness of the protector plate 180 partially larger. Furthermore, the protrusions 184 may be formed integrally with the protector plate 180, or may be formed by attaching separate parts to the protector plate 180. Moreover, the protrusions 184 are not limited to both side edges 180a, 180b of the protector plate 180, and can form a portion of or the entire protector plate 180. In this case, the area forming the protrusions 184 may be designed so that the brush cutter 200 is prevented from contacting the middle part 182 of the protector plate 180.

The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

What is claimed is:

1. A harness being wearable for a user to support a handheld power equipment, comprising:
    a backplate configured to be arranged on a back of the user and comprising a first opening and at least one ventilation groove formed on an inner surface of the backplate, wherein the at least one ventilation groove includes a ventilation groove extending from an inner edge of the backplate surrounding the first opening to an outer edge of the backplate;
    a plurality of belts, each of which has one end being connected to the backplate and another end configured to be connected to each other in front of the user; and
    an attachment supported by at least one of the backplate and the plurality of belts and configured to be attached to the power equipment, wherein
    the backplate comprises the first opening and a plurality of second openings arranged around the first opening,
    the at least one ventilation groove includes a plurality of first ventilation grooves and a plurality of second ventilation grooves,
    each of the first ventilation grooves linearly extends from one to another of the inner edge of the backplate surrounding the first opening, the inner edge of the backplate surrounding the second opening and an outer edge of the backplate,
    each of the second ventilation grooves circumferentially extends from one to another of the inner edges of the backplate surrounding the second openings, and
    at least one of the first ventilations grooves and at least one of the second ventilation grooves intersect with each other.

2. The harness as in claim 1, wherein the at least one ventilation groove is substantially semicircular in cross section in its width direction.

3. The harness as in claim 1, wherein the backplate is made of a light transmissive material.

4. The harness as in claim 1, wherein the backplate includes, in a height direction with respect to the user, a posteriorly-convex portion being convex rearward with respect to the user along the height direction, wherein, in a width direction with respect to the user, side parts of the posteriorly-convex portion of the backplate are arched more rearward than a middle part of the posteriorly-convex portion of the backplate that is located in between the side parts.

5. The harness as in claim 4, wherein the middle part of the posteriorly-convex portion of the backplate is more convex forward with respect to the user along the width direction, and the side parts in the width direction of the posteriorly-convex portion of the backplate are more convex rearward along the width direction.

6. The harness as in claim 4, wherein an upper edge of the middle part in the width direction of the backplate is arched downward.

7. The harness as in claim 4, wherein the backplate comprises an opening extending in the height direction and at least partially formed within the middle part in the width direction of the posteriorly-convex portion of the backplate.

8. The harness as in claim 1, further comprising a shoulder plate integrally formed with the backplate and configured to be arranged on a shoulder of the user.

9. The harness as in claim 8, wherein the shoulder plate has a length that extends over an uppermost portion of the shoulder of the user.

10. The harness as in claim 8, wherein the shoulder plate comprises at least one groove formed on a surface of the shoulder plate and extending across a longitudinal direction of the shoulder plate.

11. The harness as in claim 8, wherein a thickness of the shoulder plate is smaller than a thickness of the backplate.

12. The harness as in claim 8, wherein the shoulder plate is arched convexly outward in the width direction of the user along a longitudinal direction of the shoulder plate.

13. The harness as in claim 8, wherein the plurality of the belts includes a shoulder belt configured to be arranged on the shoulder of the user, and the shoulder plate comprises a plurality of belt holes through which the shoulder belt is laced.

14. A harness being wearable for a user to support a handheld power equipment, comprising:
    a backplate configured to be arranged on a back of the user and comprising an opening and at least one ventilation groove formed on an inner surface of the backplate, wherein the at least one ventilation groove includes a ventilation groove extending from an inner edge of the backplate surrounding the opening to an outer edge of the backplate;
    a plurality of belts, each of which has one end being connected to the backplate and another end configured to be connected to each other in front of the user;
    an attachment supported by at least one of the backplate and the plurality of belts and configured to be attached to the power equipment; and
    a protector plate configured to be arranged between the user wearing the harness and the handheld power equipment attached to the attachment, wherein
        the protector plate comprises at least one protrusion formed on an edge of the protector plate, the at least one protrusion protrudes toward the handheld power equipment attached to the attachment, and the handheld power equipment contacts with the protector plate at the at least one protrusion,
        the at least one protrusion is a folded portion in which a circumferential portion of the protector plate is folded with respect to a middle part of the protector plate, and a fold angle of the folded portion varies along the edge of the protector plate.

15. The harness as in claim 14, wherein the at least one protrusion includes a pair of protrusions formed on both side edges of the protector plate respectively.

16. The harness as in claim 14, wherein at least a part of the protrusion is formed on a curved edge of the protector plate.

17. The harness as in claim 14, wherein the at least one protrusion includes a pair of protrusions formed on both side edges of the protector plate respectively, and a lower part of each side edge is curved toward a center of the protector plate.

18. The harness as in claim 14, wherein the at least one protrusion varies its cross-sectional shape along the edge of the protector plate.

* * * * *